US010053180B1

(12) United States Patent
Gesto (10) Patent No.: US 10,053,180 B1
(45) Date of Patent: Aug. 21, 2018

(54) TRIKE STEERING AND SUSPENSION SYSTEMS

(71) Applicant: Tower Trikes, Inc., South Bend, IN (US)

(72) Inventor: James Gesto, South Bend, IN (US)

(73) Assignee: Tower Trikes, Inc., South Bend, IN (US)

( * ) Notice: Subject to any disclaimer, the term of this patent is extended or adjusted under 35 U.S.C. 154(b) by 0 days.

(21) Appl. No.: 15/693,419

(22) Filed: Aug. 31, 2017

(51) Int. Cl.
*B62K 21/02* (2006.01)
*B62K 5/027* (2013.01)
*B62K 25/04* (2006.01)
*B62K 21/18* (2006.01)
*B62K 5/00* (2013.01)

(52) U.S. Cl.
CPC .............. *B62K 21/02* (2013.01); *B62K 5/027* (2013.01); *B62K 21/18* (2013.01); *B62K 25/04* (2013.01); *B62K 2005/001* (2013.01)

(58) Field of Classification Search
CPC .. B60G 11/48; B60G 15/12; B60G 2300/082; B60G 2300/122; B62D 61/08; B62D 7/142; B62D 49/0607; B62D 49/00; B62D 5/02; B62D 3/04; B62K 11/00; B62K 11/12; B62K 21/02; B62K 21/18; B62K 5/027; B62K 25/04; B62K 2005/001
See application file for complete search history.

(56) References Cited

U.S. PATENT DOCUMENTS 1,345,498 A * 7/1920 McCartney ............... B60P 3/42
180/209
1,422,671 A * 7/1922 Cochran ................... B62D 7/02
280/92
(Continued)

FOREIGN PATENT DOCUMENTS

EP 0083911 A1 7/1983
GB 408592 A 10/1932
(Continued)

OTHER PUBLICATIONS

Gesto, James. Declaration of Applicant James Gesto. Nov. 28, 2017. 5 pages.
(Continued)

*Primary Examiner* — Joseph M Rocca
*Assistant Examiner* — Timothy Wilhelm
(74) *Attorney, Agent, or Firm* — Beem Patent Law Firm (57) ABSTRACT

Improved suspension and steering systems for a trike may include a steering assembly including a power steering assembly coupled to a steering wheel and a front frame assembly. The front frame assembly may include a front plate coupled to a steering hub and two front suspension piston and sleeve assemblies. The front plate and steering hub may be positioned above the front tire so that front tire rotates about an axis that is substantially perpendicular with the surface of the road. This system reduces and/or eliminates problems associated with traditional steering assemblies, such as wheel flop, limited tire life, driver burden, and the like. In addition, the front suspension piston and sleeve assemblies also may be positioned substantially perpendicularly to the road surface to reduce and/or eliminate lateral forces on the trike and changes to the overall geometry of the trike during usage.

15 Claims, 5 Drawing Sheets

(56) References Cited

U.S. PATENT DOCUMENTS

| | | | | |
|---|---|---|---|---|
| 1,641,813 | A * | 9/1927 | Johnston | B60K 17/00 180/217 |
| 1,689,582 | A * | 10/1928 | Duresen | B62K 11/00 280/277 |
| 1,972,354 | A * | 9/1934 | North | B62K 25/16 280/124.126 |
| 2,074,685 | A * | 3/1937 | Engstrom | B62D 49/00 180/209 |
| 2,094,871 | A * | 10/1937 | Brown | B62D 49/00 180/340 |
| 2,615,727 | A * | 10/1952 | Bancroft | B62K 5/027 280/124.103 |
| 2,639,165 | A * | 5/1953 | Winters | B60G 11/14 267/221 |
| 2,749,137 | A * | 6/1956 | Thomsen | A01D 75/28 180/209 |
| 2,768,531 | A * | 10/1956 | Lincoln | B62D 5/24 180/427 |
| 2,796,851 | A * | 6/1957 | Ziskal | B62D 5/087 137/625.26 |
| 2,809,532 | A * | 10/1957 | Ethington | B62D 5/24 180/429 |
| 2,828,641 | A * | 4/1958 | Larsen | B62D 5/14 180/429 |
| 2,869,665 | A * | 1/1959 | Beck | B62D 5/24 180/429 |
| 2,874,792 | A * | 2/1959 | Scheuerpflug | B62D 7/1509 180/409 |
| 2,874,972 | A * | 2/1959 | Andersen | B62D 49/0607 280/124.113 |
| 4,016,948 | A * | 4/1977 | Kuester | B62D 5/06 180/323 |
| 4,063,608 | A * | 12/1977 | Sullivan | B60K 17/10 180/215 |
| 4,064,957 | A * | 12/1977 | Parham | B62D 61/08 180/215 |
| 4,065,144 | A * | 12/1977 | Winchell | B60G 21/00 180/217 |
| 4,088,199 | A * | 5/1978 | Trautwein | B60G 21/007 180/209 |
| 4,157,739 | A * | 6/1979 | Frye | B62K 21/00 180/219 |
| 4,206,907 | A * | 6/1980 | Harrod | B60G 15/14 267/220 |
| 4,353,567 | A * | 10/1982 | Weldy | B62D 61/08 180/211 |
| 4,368,795 | A * | 1/1983 | Tidwell | B62D 47/02 180/212 |
| 4,460,186 | A * | 7/1984 | Hildebrand | B60G 3/01 15/83 |
| 4,542,910 | A * | 9/1985 | Watanabe | B62K 25/16 280/276 |
| 4,690,427 | A * | 9/1987 | Raidel, Sr. | B60G 3/00 280/124.118 |
| 4,917,209 | A * | 4/1990 | Horiike | B62K 11/00 180/219 |
| 4,974,872 | A * | 12/1990 | Riese | B60G 3/00 280/124.145 |
| 5,014,807 | A * | 5/1991 | Horiike | B62K 11/00 180/219 |
| 5,015,009 | A * | 5/1991 | Ohyama | B60G 17/0162 280/5.51 |
| 5,066,030 | A * | 11/1991 | Brett | B60G 3/185 180/215 |
| 5,116,069 | A * | 5/1992 | Miller | B60G 3/14 180/210 |
| 5,156,231 | A * | 10/1992 | Trema | B62K 25/005 180/219 |
| 5,343,972 | A * | 9/1994 | Balmer | B62D 49/065 171/143 |
| 5,597,172 | A * | 1/1997 | Maiwald | B60G 3/00 280/124.153 |
| 5,603,387 | A * | 2/1997 | Beard | B60G 17/0152 180/89.12 |
| 5,851,015 | A * | 12/1998 | Klosterhaus | B62D 7/10 180/437 |
| 5,967,538 | A * | 10/1999 | Callaluca | B62K 21/00 180/219 |
| 6,199,885 | B1 * | 3/2001 | Seidl | B62K 21/20 280/276 |
| 6,241,391 | B1 * | 6/2001 | Hoose | B60G 3/01 188/322.16 |
| 6,328,125 | B1 * | 12/2001 | Van Den Brink | B60G 17/0162 180/211 |
| 6,371,237 | B1 * | 4/2002 | Schaffer | B60G 11/28 180/253 |
| 6,371,263 | B1 * | 4/2002 | Hoose | B60G 3/01 188/312 |
| 6,435,522 | B1 * | 8/2002 | Van Den Brink | B62D 9/02 180/210 |
| 6,533,305 | B1 * | 3/2003 | Falk | B62K 25/08 180/219 |
| 6,641,154 | B1 * | 11/2003 | Vey | B60G 11/27 280/124.11 |
| 6,749,035 | B2 * | 6/2004 | Bundy | A01L 363/1006 172/7 |
| 6,763,905 | B2 * | 7/2004 | Cocco | B60G 21/007 180/210 |
| 6,845,973 | B2 * | 1/2005 | Ferrer | F16F 9/0454 267/64.21 |
| 6,898,501 | B2 * | 5/2005 | Schubert | B60G 17/0165 180/89.12 |
| 6,902,022 | B2 * | 6/2005 | Mathukia | B60B 35/1081 180/209 |
| 7,111,700 | B2 * | 9/2006 | Czysz | B62K 21/02 180/219 |
| 7,137,638 | B2 * | 11/2006 | Turner | B62K 21/02 280/276 |
| 7,216,733 | B2 * | 5/2007 | Iwami | B62K 5/01 180/443 |
| 7,226,045 | B2 * | 6/2007 | Brookes | B60G 13/003 188/321.11 |
| 7,252,169 | B2 * | 8/2007 | McLean | A01B 51/026 180/209 |
| 7,273,117 | B2 * | 9/2007 | Pond | B60G 3/145 180/24.02 |
| 7,331,594 | B2 * | 2/2008 | Wimmer | B62K 17/00 280/276 |
| 7,445,070 | B1 * | 11/2008 | Pickering | B62D 61/08 180/211 |
| 8,141,890 | B2 * | 3/2012 | Hughes | B60G 21/007 180/210 |
| 8,256,555 | B2 * | 9/2012 | Ackley | B62K 5/027 180/210 |
| 8,342,548 | B1 | 1/2013 | Vey et al. | |
| 8,607,914 | B2 * | 12/2013 | Lee | B60G 3/00 180/210 |
| 8,684,124 | B2 * | 4/2014 | Schwindt | B62K 21/20 180/227 |
| 8,781,684 | B2 * | 7/2014 | Bruce | B62D 5/0457 180/210 |
| 8,783,704 | B2 * | 7/2014 | Richards | B62K 25/04 280/275 |
| 8,827,292 | B2 * | 9/2014 | Batsch | B60G 15/02 267/226 |
| 8,833,785 | B2 * | 9/2014 | Wagner | B62K 21/00 180/219 |
| 8,979,076 | B2 * | 3/2015 | Oldenettel | F16F 9/38 267/64.24 |
| 9,145,039 | B2 * | 9/2015 | Dehmel | B60G 17/044 |
| 9,227,662 | B2 * | 1/2016 | Bartolozzi | B60G 3/01 |
| 9,290,231 | B1 * | 3/2016 | Jurrens | F16F 9/084 |
| 9,381,785 | B2 * | 7/2016 | Gale | B60G 3/145 |
| 9,714,066 | B1 * | 7/2017 | Arnott | B62K 25/04 |
| 2002/0180126 | A1 * | 12/2002 | DeLizo | F27L 314/10 266/283 |
| 2003/0102176 | A1 * | 6/2003 | Bautista | B60G 21/007 180/210 |

(56) References Cited

U.S. PATENT DOCUMENTS

| | | | |
|---|---|---|---|
| 2004/0094346 A1* | 5/2004 | Vey | B60G 11/27 180/210 |
| 2006/0042861 A1* | 3/2006 | Ovshinsky | B62D 5/0439 180/443 |
| 2006/0273540 A1* | 12/2006 | Heron | B60G 5/02 280/124.116 |
| 2012/0056389 A1 | 3/2012 | Leclerc et al. | |
| 2014/0232086 A1 | 8/2014 | Dyar | |
| 2015/0054247 A1* | 2/2015 | Barefoot | B60G 11/27 280/124.157 |
| 2015/0091271 A1 | 4/2015 | Ikeda | |
| 2015/0202936 A1* | 7/2015 | Becker | B60G 9/00 280/124.106 |

FOREIGN PATENT DOCUMENTS

| | | |
|---|---|---|
| GB | 585122 A | 2/1945 |
| JP | 09226614 A * | 9/1997 |
| RU | 160767 U1 | 3/2016 |

OTHER PUBLICATIONS

Gesto, James. Photo of Prototype Test Unit on Road. Fall 2015. South Bend, Indiana. 1 page.

Gesto, James. Photo of Prototype Test Unit at Afdent Autofest. Mar. 19-20, 2016. South Bend, Indiana. 1 page.

Gesto, James. Photo of Board Shown in Front of Prototype Trike. Mar. 19-20, 2016. South Bend, Indiana. 1 page.

\* cited by examiner

TRIKE STEERING AND SUSPENSION SYSTEMS

BACKGROUND OF THE INVENTION

1. Technical Field

The present invention relates to steering systems and suspension systems for motor vehicles, and more particularly to steering systems and suspensions systems for motorized tricycles, or trikes.

2. Related Art

Trikes have been steadily increasing in popularity in recent times as they provide open air, wind in your face thrills of riding a motorcycle while also offering increased stability and comfort as a result of having three wheels. Because trikes may have a single front wheel, they typically employ steering and suspension systems found in motorcycles.

Motorcycle and bicycle suspensions are used to absorb bumps, cracks, and roadway deformities to provide a rider with a smoother ride and allow the rider to maintain control of the vehicle. A girder fork or girder front end is a common front end suspension in motorcycles and trikes. A traditional girder fork has a pair of uprights that is connected to a front wheel axle on one end and two links on the other end. A spring or springs, most commonly a coil spring(s), connects the lower link to an upper link having a set of handle bars mounted thereon. Leaf springs also have been used in front suspensions. The leaf spring typically is mounted to a bracket extending above the front wheel, and it connects the girder forks or leading or trailing links to the front wheel.

In either case, the girder forks are disposed at an angle, called the steering axis angle or rake, typically between about 20 and 30 degrees short of vertical. As a result, there is an offset between where the wheel touches the ground and where the steering axis intersects the ground, known as a trail. Less rake means less trail, which means a quicker turning bike that is less stable at speed. Conversely, more rake means more trail, which provides a more stable ride at speed but makes the bike more difficult to turn. Rake and trail also lead to a phenomenon known as wheel flop. During wheel flop, the motorcycle turns more than expected due to the front wheel "flopping" over when the handlebars are rotated because the front end of the motorcycle lowers as the handlebars are rotated from side to side.

In both of the aforementioned types of suspensions, steering and suspension are coupled together, meaning when a rider rotates the handle bars to turn the front wheel and ultimately steer the bike, the spring mounted to the girder front end simultaneously moves with all of the components of the girder front end. In addition, the weight of the spring adds to the unsprung weight or weight not supported by the suspension of the bike. Generally, a greater amount of unsprung weight produces a poor ride quality and potential wheel control issues when accelerating or braking. In addition, as the weight of these systems is increased, their coupling to one another makes it difficult to turn for even experienced riders.

The fork front suspension systems used today also suffer a serious disadvantage: the effective wheelbase of the motorbike continually changes. For example, when the motorbike travels over a bump, the front wheel moves up and back relative to the frame, and the wheelbase is shortened, which means less stability at speed.

Another consequence of typical steering and suspension systems is tire wear. Typical motorcycle and trike front wheels are designed to provide braking and turning functionality and are shaped to provide these features. For example, front tires have triangular shapes to assist in turning. Because front tires are not relied upon during acceleration, they also have a thinner tread compared to rear tires. As a result, they tend to wear down easily.

Thus, a need has long existed for even further improved steering and suspension systems and methods for trikes.

SUMMARY

Improved suspension and steering systems for a trike may include a steering assembly including a power steering assembly coupled to a steering wheel and a front frame assembly. The front frame assembly may include a front plate coupled to a steering hub and two front suspension piston and sleeve assemblies. The front plate and steering hub may be positioned above the front tire so that front tire rotates about an axis that is substantially perpendicular with the surface of the road. This system reduces and/or eliminates problems associated with traditional steering assemblies, such as wheel flop, limited tire life, driver burden, and the like. In addition, the front suspension piston and sleeve assemblies also may be positioned substantially perpendicularly to the road surface to reduce and/or eliminate lateral forces on the trike and changes to the overall geometry of the trike during usage.

Other systems, methods, features and technical advantages of the invention will be, or will become apparent to one with skill in the art, upon examination of the figures and detailed description. It is intended that all such additional systems, methods, features and technical advantages be included within this summary and be protected by the claims.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION OF THE PREFERRED EMBODIMENTS

The elements illustrated in the figures interoperate as explained in more detail below. Before setting forth the detailed explanation, however, it is noted that all of the discussion below, regardless of the particular implementation being described, is exemplary in nature, rather than limiting.

1.0 Trike Overview

Figure 1:
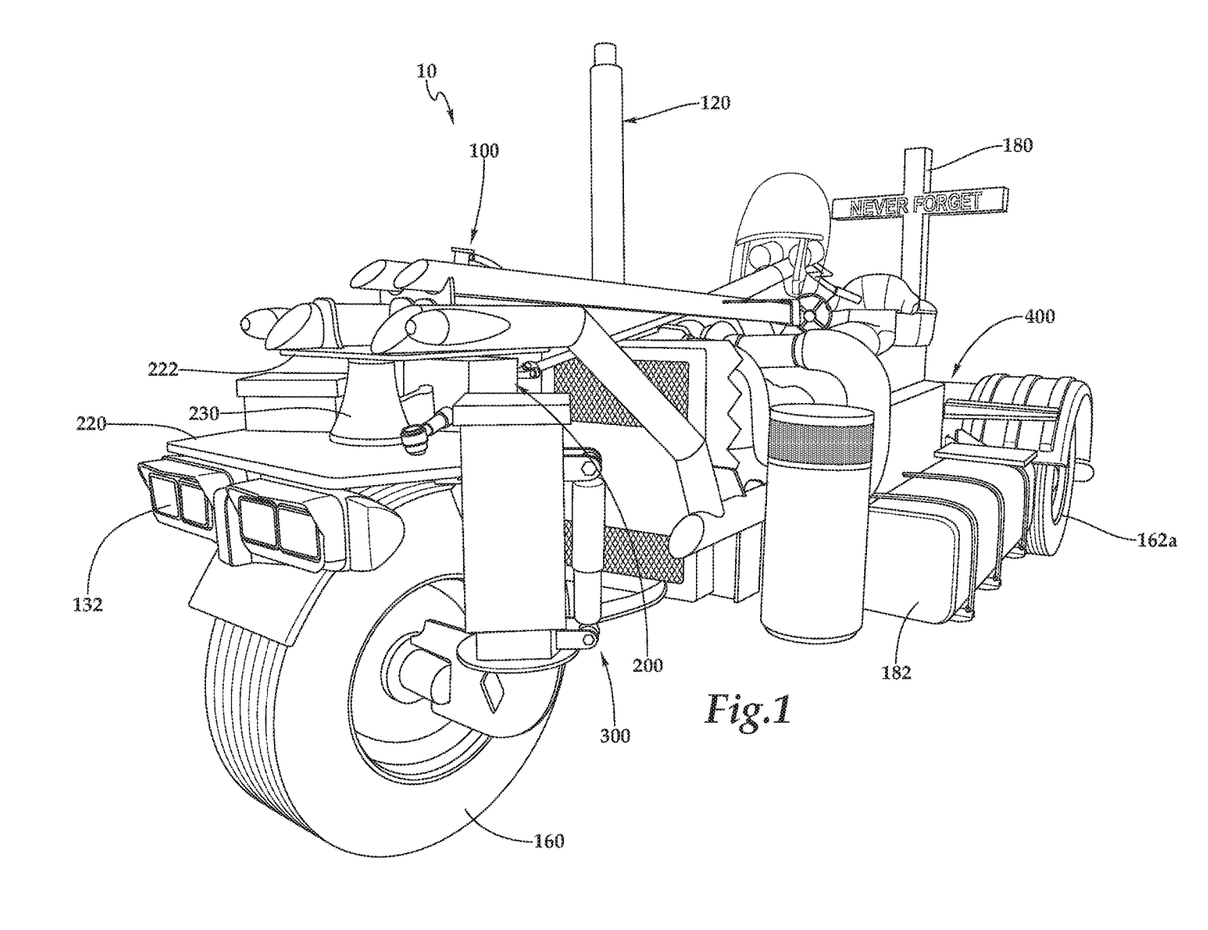
FIG. 1 shows a perspective view of an exemplary trike.
Figure 2:
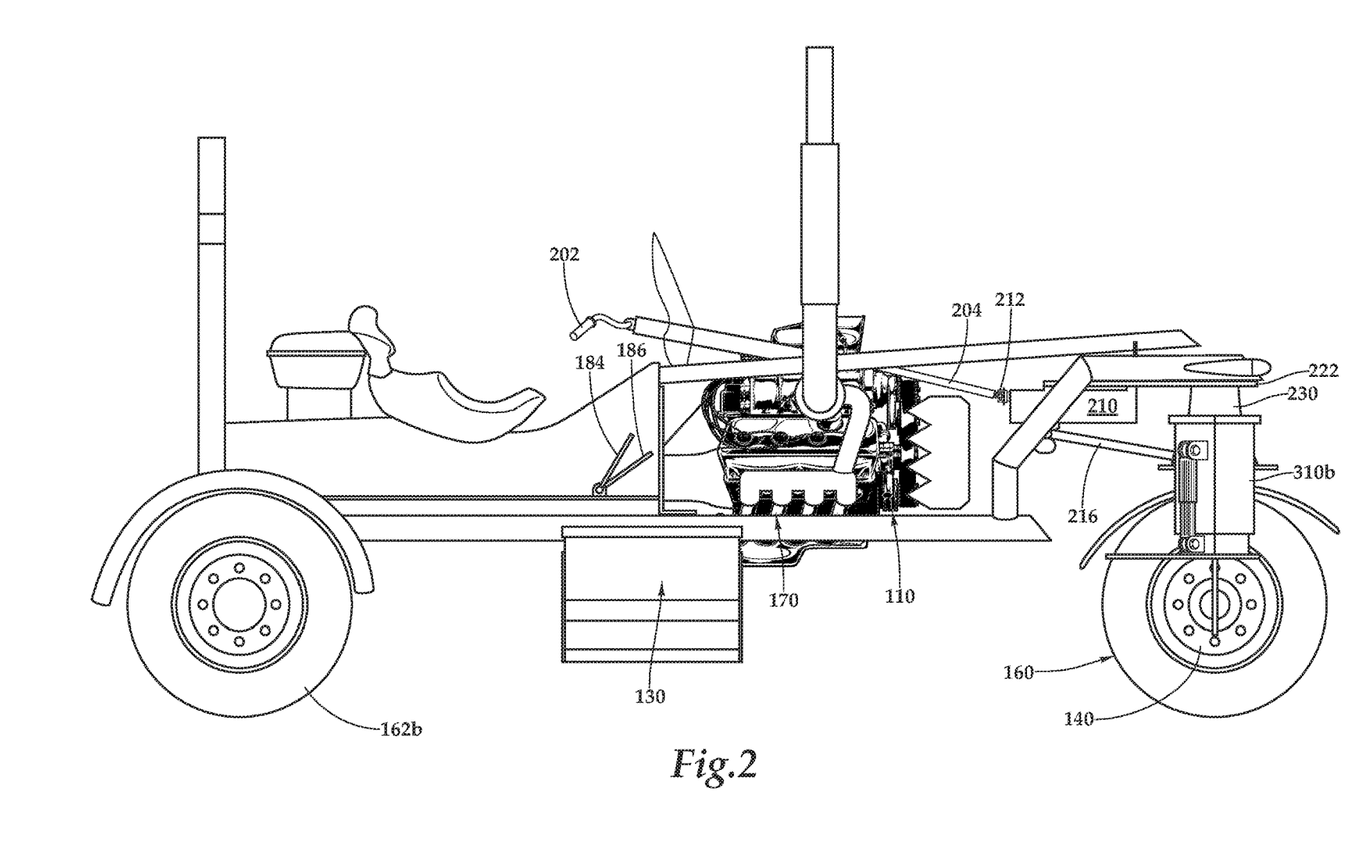
FIG. 2 shows a side view of the exemplary trike of FIG. 1.

Referring to the drawings, and initially to FIGS. 1 and 2, a perspective view and a side view of an exemplary trike 10 are shown, respectively. Only relevant portions of the trike 10 are shown. In the illustrated embodiment, the trike 10 may include a frame assembly 100, an engine 110, exhaust system 120, electrical system 130, a steering assembly 200, a front suspension assembly 300, a disk brake 140, a front wheel 160, headlights 132, two rear wheels 162a and 162b, a rear suspension assembly 400, a compressor 170, a roll bar 180, fuel tank 182, accelerator 184 and brake pedal 186.

The various components of the trike 10 may be made of any suitably hard materials, such as steel, carbon fiber and the like. Other materials also may be used. In some embodiments, each component is made of the same material. Alternatively or additionally, one or more of the components of the trike may be made of different material than others of the components.

In the illustrated embodiment, the trike 10 is about 18′ 8″ long, 8′ 8″ tall, 8″ 5″ wide and weighs about 10,780 pounds (lbs.). The trike 10 also may be made in other dimensions and weights, such as lighter, shorter, and the like. The engine 110 in the illustrated embodiment is a two stroke V block diesel, supercharged, turbocharged Silver 6V92 Detroit provided by Detroit Diesel Corporation of Detroit Mich. and producing about 335 HP and about 1020 ft./lb. peak torque. The illustrated fuel tank 182 holds about 80 gallons of fuel that is delivered to the engine 110 via an intake system controlled by the driver via accelerator 184, which may be a foot pedal similar to those in cars. A brake pedal 186 also may be provided to operate disc brake 140, which in the illustrated embodiment is an air disc brake coupled to front t 160 is a dual piston air disc brake such as the Bendix® ADB22X™ air disc brakes provided by Bendix Spicer of Elyria, Ohio. Other dimensions and components also may be used.

2.0 Exemplary Steering Assemblies 200

Figure 3:
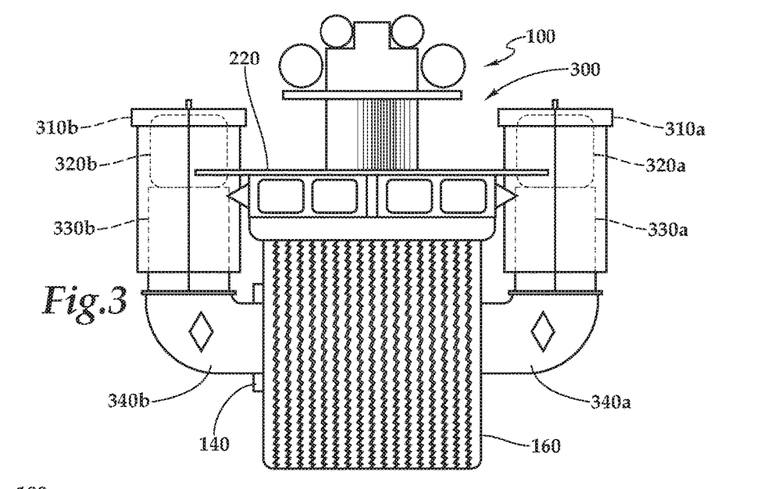
FIG. 3 shows a front view of the exemplary trike shown in FIG. 1.
Figures 4, 5:
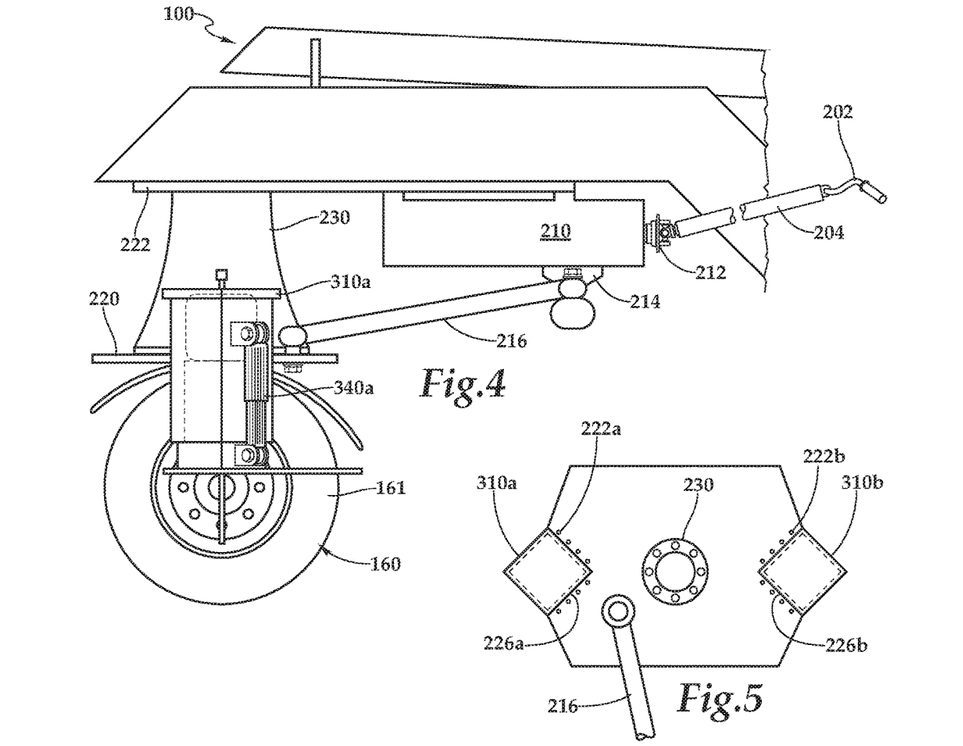
FIG. 4 shows a partial side view of the front of the exemplary trike shown in FIG. 1.
FIG. 5 shows a top view of components of an exemplary front suspension for use with the exemplary trike shown in FIG. 1.

Referring now to FIGS. 3 and 4, a front view and a partial side view of the front of an exemplary trike 10 are shown. The steering assembly 200 may include a steering wheel 202 coupled to a steering shaft 204 that is in turn coupled to an actuator shaft 212 or input shaft 212 of a power steering gear box 210. The power steering gear box 210 also may include a steering arm or output shaft 214 coupled to a steering linkage 216 that is coupled to a steering and suspension plate 220. For example, the steering linkage 216 may be bolted to the front steering and suspension plate 220. Other coupling methods also may be used. The steering and suspension plate 220 may be disposed above the front wheel 160 and coupled to the front axle 170 via suspension piston and sleeve assemblies 310a and 310b and suspension bolts 340a and 340b. The steering and suspension plate 220 also may be coupled to a steering hub and bearing assembly 230 positioned above the center of the wheel 160, which may be coupled to an upper steering plate 222 that is coupled to the frame 100, such as by welding.

In operation, the driver may turn the steering wheel 202 to cause the power steering gear box 210 to rotate the steering arm 214, which in turn causes the steering and suspension plate 220 to rotate about an axis that is substantially perpendicular to the road surface. This unique steering configuration provides several benefits. First, the manual effort of the driver is significantly reduced because the driver is required to provide only enough force to rotate the actuator shaft 212 of the power steering gear box 210—the driver is no longer required to rotate the entire front end of the tike to turn the front wheel 160. This also enables larger and heavier materials, such as wheels, suspension components and the like, to be used in the front of the trike. For example, in the illustrated embodiment, the weight bearing on the front of the trike 10 is approximately 5,700 pounds.

Second, because the front wheel 160 rotates about an axis perpendicular to the road surface, the front wheel 160 may maintain increased contact with the road during a turn, regardless of the wheel's shape. As a result, a traditional round shaped front tire is not required. Instead, typical car and truck tires may be used as front wheels on trikes employing this unique design. This enables stronger, longer lasting tires to be used. For example, in the illustrated embodiment, front tire 160 is a 445/75R steer tire "super single," which is about fifteen inches wide and is rated to last about 100,000 miles under a 20,000 pound load. This provides a greatly enhanced life for the tire as compared to typical motorcycle and trike front tires, which are not manufactured to carry a load. In some instances, this tire may never need to be replaced for the life of the trike. Other tires also may be used.

Third, the wheelbase of the trike as well as its overall geometry remains consistent. Because the trike geometry does not change during turns or when encountering a bump in the road, the steering system 200 provides a smooth ride that is easier on the driver. In addition, wheel flop is eliminated.

The steering wheel 202 may be any type or shape of steering wheel. In some embodiments, the steering wheel 202 is shaped to resemble handlebars, such as those typically found on a motorcycle or trike. However, in the illustrated embodiment, the steering wheel 202 is not a handlebar but operated like a typical steering wheel, rotating approximately 800° end-to-end to turn the front tire 160 as described above.

2.1 Exemplary Power Steering Gear Boxes 10

The power steering gear box 210 may be any type of power steering system such as a worm drive power steering system, recirculating ball steering system, rack and pinion steering system, and the like. For example, in the illustrated embodiment, the power steering gear box is a SHEPPARD M100 provided by R.H. Sheppard Company, Inc., of Hanover, Pa. Other power steering gear boxes also may be used.

2.2 Exemplary Steering Hubs 230

Figures 6, 7A, 7B:
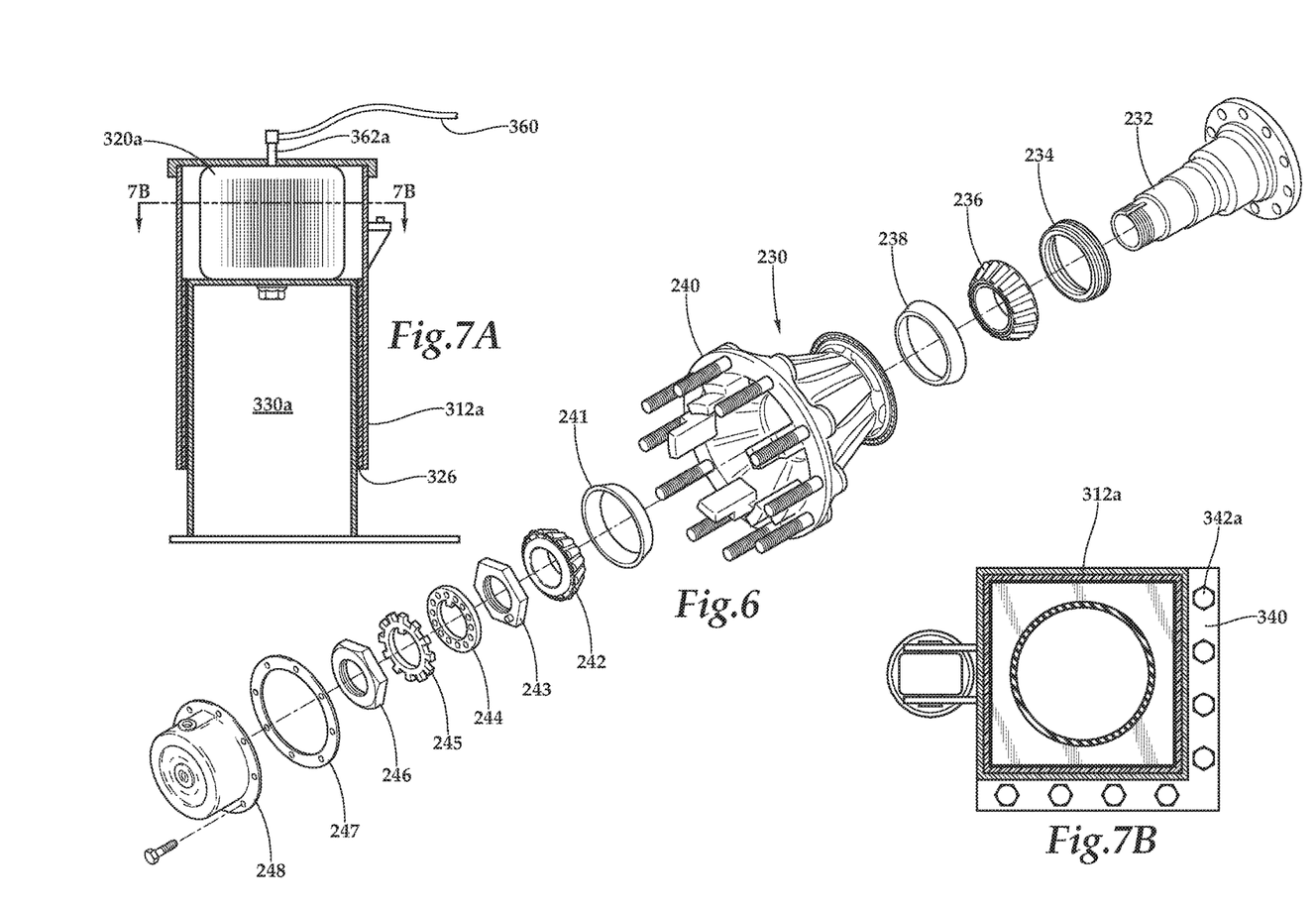
FIG. 6 shows an exploded view of an exemplary hub for use in the steering system of the exemplary trike shown in FIG. 1.
FIGS. 7A and 7B show side and top views an exemplary fork tube of the exemplary trike shown in FIG. 1.

Referring to FIG. 6, an exemplary steering hub 230 is shown in exploded view. In the illustrated embodiment, the steering hub 230 is an LMS steer hub provided by Dana Inc. of Maumee, Ohio. The hub 230 may include a spindle 232, a unitized hub oil seal 234, an inner bearing cone 236, an inner bearing cup 238, a hub body 240, an outer bearing cup 241, an outer bearing cone 242, a spindle nut and locking system including an inner jam nut 243, a spindle washer 244, a lock ring 245 and an outer jam nut 246, a gasket 247, and a hub cap 248. Other steering hubs 230 also may be used. As noted above, the steering hub 230 may be position above the front tire 161 so that the front tire 161 rotates about an axis that is substantially parallel to the road surface.

3.0 Exemplary Front Suspension Systems 300

Referring to FIGS. 3, 4 and 5, various views of a front suspension system 300 are shown. FIG. 3 shows a front view of the exemplary trike of FIG. 1, FIG. 4 shows a partial side view of the front of the exemplary trike shown in FIG. 1, and FIG. 5 shows a top view of components of an exemplary front suspension for use with the exemplary trike shown in FIG. 1. In the illustrated embodiment, the front suspension system 300 may include a steering and suspension plate 220, two front suspension piston and sleeve assemblies 310a and 310b, front suspension bolts 340a and 340b and an axle 170. The steering and suspension plate 220 may be attached to the trike frame 100, such as by being bolted to a steering hub 230 that is in turn bolted to the frame 100 as shown in the illustrated embodiment.

The steering and suspension plate 220 also may be attached to front suspension piston and sleeve assemblies 310a and 310b. The front suspension piston and sleeve assemblies 310a and 310b may act as girders for the to the steering and suspension plate 220. In the illustrated embodiment, the front piston and sleeve assemblies 310a and 310b may be bolted to the steering and suspension plate 220 by aligning apertures 342 of mounting bracket 340 with a corresponding sets of apertures 222a and 222b in the steering and suspension plate 220. The apertures 222a and 222b may be disposed on opposite sides of the steering and suspension plate 220 so that the piston and sleeve assemblies 310a and 310b are positioned on both sides of the front wheel 160. As a result, the piston and sleeve assemblies 310a and 310b may be disposed substantially vertically, which provides better weight distribution and increased load capabilities over prior art systems.

In the illustrated embodiment, the steering and suspension plate 220 is made of one inch thick steel and is substantially hexagonally shaped like a pair of bilaterally symmetrical trapezoids sharing a common side that has two recessed portions 226a and 226b for receiving the front piston and sleeve assemblies 310a and 310b. Because the front piston and sleeve assemblies 310a and 310b are substantially square, the recessed portions 226a and 226b may comprises two sides disposed at a 90° angle for receiving two sides of the front piston and sleeve assemblies 310a and 310b. Other shapes may be used.

3.1 Exemplary Suspension Piston and Sleeve Assemblies 310a and 310b

Referring to FIGS. 5, 7A, and 7B, an exemplary suspension piston and sleeve assembly 310a is shown in a first top view, a side view, and a second top view, respectively. The suspension piston and sleeve assembly 310a may include a sleeve 312 coupled to the steering and suspension plate 220 and an axle extension 122 that extends outward from the front wheel 160. Inside the sleeve 312, an air spring 320 may be positioned atop a cylinder or piston 330 that is contained within a poly liner 326. In some embodiments, a shock absorber 340 (FIG. 4) may be coupled to the sleeve 312.

In the illustrated embodiment, sleeve 312 is a 10 inch by 10 inch square tube having a height of about 22.5 inches and the piston 330 may be an 8 inch by 8 inch tube having a height of about 15.5 inches. Other dimensions may be used depending on the size of the air spring 320, the front tire, and the other components of the trike.

Air spring 320 may be any type of air spring. In the illustrated embodiment, the air spring 320 is a 7" AIRRIDE air spring provided by Firestone Tire and Rubber Company of Akron, Ohio. The air spring 320 may receive air from an air supply unit or compressor 170 (which may be a BENDIX TUFLO 550 provided by Bendix Commercial Vehicles Systems LLC of Elyria, Ohio) coupled to air supply inlet 362. The air spring 320 may be set to a variety of different pressures depending on the circumstances. For example, the pressure in air spring 320 may be between about 60 PSI and about 85 PSI, preferably between about 68 PSI and about 78 PSI, and even more preferably between about 71-73 PSI. Other pressures also may be used.

Poly liner 326 may encompass the piston 330 and provide lubrication and/or noise reduction between the piston 330 and the sleeve 312. In some embodiments, poly liner 326 may be a high impact polyoxymethylene liner. In the illustrated embodiment, four 15" by 8" pieces of 0.5" thick polyoxymethylene liner may be disposed around the piston 330, one on each side. Other materials and lubrication methods also may be used.

Optionally, shock absorber 340 (FIG. 4) may be coupled to the sleeve 312. Shock absorber 340 may provide dampening of various forces encountered when driving over typical road surfaces. In the illustrated embodiment, shock absorber 340 is a Monroe Heavy Duty Truck Shock rated for 20,000 lbs. Shock absorber 340 may be bolted to the exterior of sleeve 312. Alternatively, or additionally, shock absorber 340 may be disposed inside sleeve 312, either partially or completely.

4.0 Exemplary Rear Suspension Assembly 400

Figure 8:
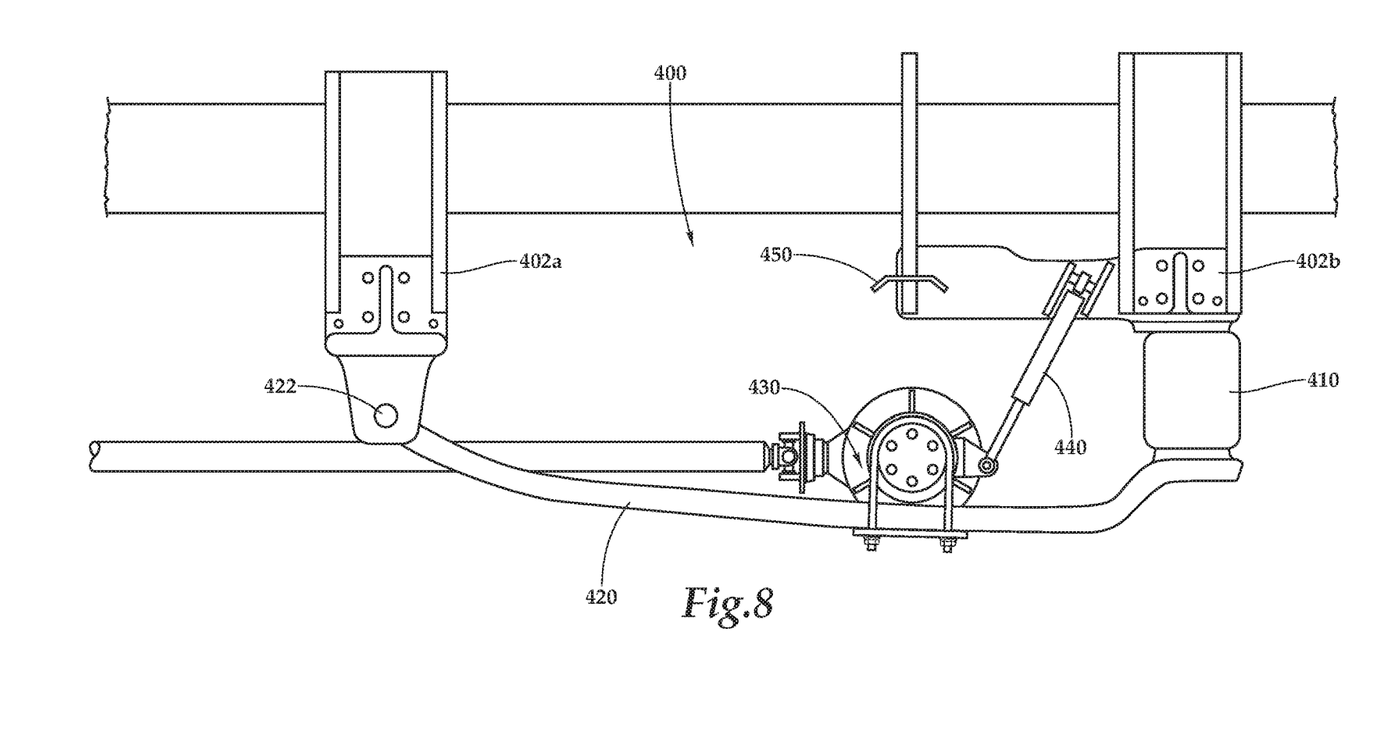
FIG. 8 shows a diagram of an exemplary rear suspension assembly for use in the exemplary trike shown in FIG. 1.

Referring to FIG. 8, an exemplary rear suspension assembly 400 may include an air spring 410, a trailing arm 420, a brake and tire mount 430, mounting brackets 402a and 402b, a shock absorber 440 and a shock absorber mounting bracket 442. In the illustrated embodiment, a suspension assembly 400 may be provided on each rear wheel 162a and 162b.

Air spring 410 may be coupled to the frame 100 via a mounting bracket 402b. Air spring 410 also may be coupled to the trailing arm 420 by one or more bolts. Air spring 410 may be any type of air spring. In the illustrated embodiment, the air spring 410 is a 7" AIRRIDE air spring provided by Firestone Tire and Rubber Company of Akron, Ohio. The air spring 410 may receive air from an air supply unit or compressor coupled to air supply inlet. The air spring 410 may be set to a variety of different pressures depending on the circumstances. For example, the pressure in air spring 410 may be between about 10 PSI and about 35 PSI, preferably between about 18 PSI and about 28 PSI, and even more preferably between about 21-23 PSI. Other pressures also may be used.

The trailing arm 420 also may be coupled to a rear wheel 162a by brake and tire mount 430 and may be pivotally mounted to the frame 100 by bushing 422 and another mounting member 402a. The trailing arm 420 may act as a leaf spring in combination with air spring 410 to suspend the rear of the trike 10. For example, in the illustrated embodiment, the weight bearing on the rear wheels of the trike 10 is approximately 5,000 pounds.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A suspension system for a motorized tricycle that includes a frame and a front wheel, the suspension system comprising:

a suspension plate positioned above the front wheel;

a first piston and sleeve assembly coupled to the suspension plate on a first side of the front wheel, the first piston and sleeve assembly also coupled to the front wheel, the first piston and sleeve assembly disposed in a substantially vertical position and having a central vertical axis substantially perpendicular to a road surface and substantially aligned with the center of the front wheel, the first piston and sleeve assembly having:

a piston disposed partially inside a sleeve, and
a polyethylene liner disposed between the piston and an interior surface of the sleeve, and
an air spring disposed inside the sleeve; and
a second piston and sleeve assembly coupled to the suspension plate on a second side of the front wheel, the second piston and sleeve assembly also coupled to the front wheel, the second piston and sleeve assembly disposed in a substantially vertical position and having a central vertical axis substantially perpendicular to a road surface and substantially aligned with the center of the front wheel, the second piston and sleeve assembly having:
a piston disposed partially inside a sleeve, and
a polyethylene liner disposed between the piston and an interior surface of the sleeve, and
an air spring disposed inside the sleeve.

2. The suspension system of claim 1, where the piston of the first piston and sleeve assembly is coupled to its air spring to position the air spring proximate the top of the sleeve, and the piston of the second piston and sleeve assembly is coupled to its air spring to position the air spring proximate the top of the sleeve.

3. The suspension system of claim 1, where the polyethylene liner is disposed between the piston and an interior surface of the sleeve at all points of contact between the piston and the sleeve.

4. The suspension system of claim 1, further comprising a shock absorber mounted to the sleeve.

5. The suspension system of claim 4, where the shock absorber is mounted to an exterior surface of the sleeve.

6. The suspension system of claim 5, where the shock absorber is a heavy duty truck shock.

7. The suspension system of claim 1, where the air spring is inflated between about 60 PSI and about 85 PSI.

8. A motorized tricycle comprising:
a frame;
an engine disposed on the frame;
a steering system comprising:
a steering wheel;
a power steering gear box coupled to the steering wheel, the power steering gear box including a steering arm;
a steering plate coupled to the steering arm of the power steering gear box by a linkage, the steering plate also coupled to the front wheel; and
a hub and bearing assembly coupled to the steering plate and the trike frame, the hub and bearing assembly operable to rotate about an axis substantially perpendicular to a road surface, the hub and bearing assembly coupled to the steering plate such that rotation of the hub and bearing assembly causes rotation of the steering plate and the front tire about the axis; and
a front suspension system comprising:
a suspension plate positioned above the front wheel;
a first piston and sleeve assembly coupled to the suspension plate on a first side of the front wheel, the first piston and sleeve assembly also coupled to the front wheel, the first piston and sleeve assembly disposed in a substantially vertical position and having a central vertical axis substantially perpendicular to a road surface and substantially aligned with the center of the front wheel, the first piston and sleeve assembly having:
a piston disposed partially inside a sleeve, and
a polyethylene liner disposed between the piston and an interior surface of the sleeve, and
an air spring disposed inside the sleeve; and
a second piston and sleeve assembly coupled to the suspension plate on a second side of the front wheel, the second piston and sleeve assembly also coupled to the front wheel, the second piston and sleeve assembly disposed in a substantially vertical position and having a central vertical axis substantially perpendicular to a road surface and substantially aligned with the center of the front wheel, the second piston and sleeve assembly having:
a piston disposed partially inside a sleeve, and
a polyethylene liner disposed between the piston and an interior surface of the sleeve, and
an air spring disposed inside the sleeve.

9. The motorized tricycle of claim 8, further comprising a first shock absorber mounted to the sleeve of the first piston and sleeve assembly and a second shock absorber mounted to the sleeve of the second piston and sleeve assembly.

10. The motorized tricycle of claim 9, where the first shock absorber is mounted to an exterior surface of the sleeve of the first piston and sleeve assembly and the second shock absorber is mounted to an exterior surface of the second sleeve.

11. The motorized tricycle of claim 10, where the shock absorber is a heavy duty truck shock.

12. The motorized tricycle of claim 8, where the power steering gear box includes a worm drive.

13. The motorized tricycle of claim 8, where the air spring of the first piston and sleeve assembly and the air spring of the second piston and sleeve assembly are each inflated between about 60 PSI and about 85 PSI.

14. The motorized tricycle of claim 8, where the piston of the first piston and sleeve assembly is coupled to its air spring to position the air spring proximate the top of the sleeve, and the piston of the second piston and sleeve assembly is coupled to its air spring to position the air spring proximate the top of the sleeve.

15. The motorized tricycle of claim 8, where the hub and bearing assembly is disposed directly over the front wheel.

\* \* \* \* \*